UNITED STATES PATENT OFFICE.

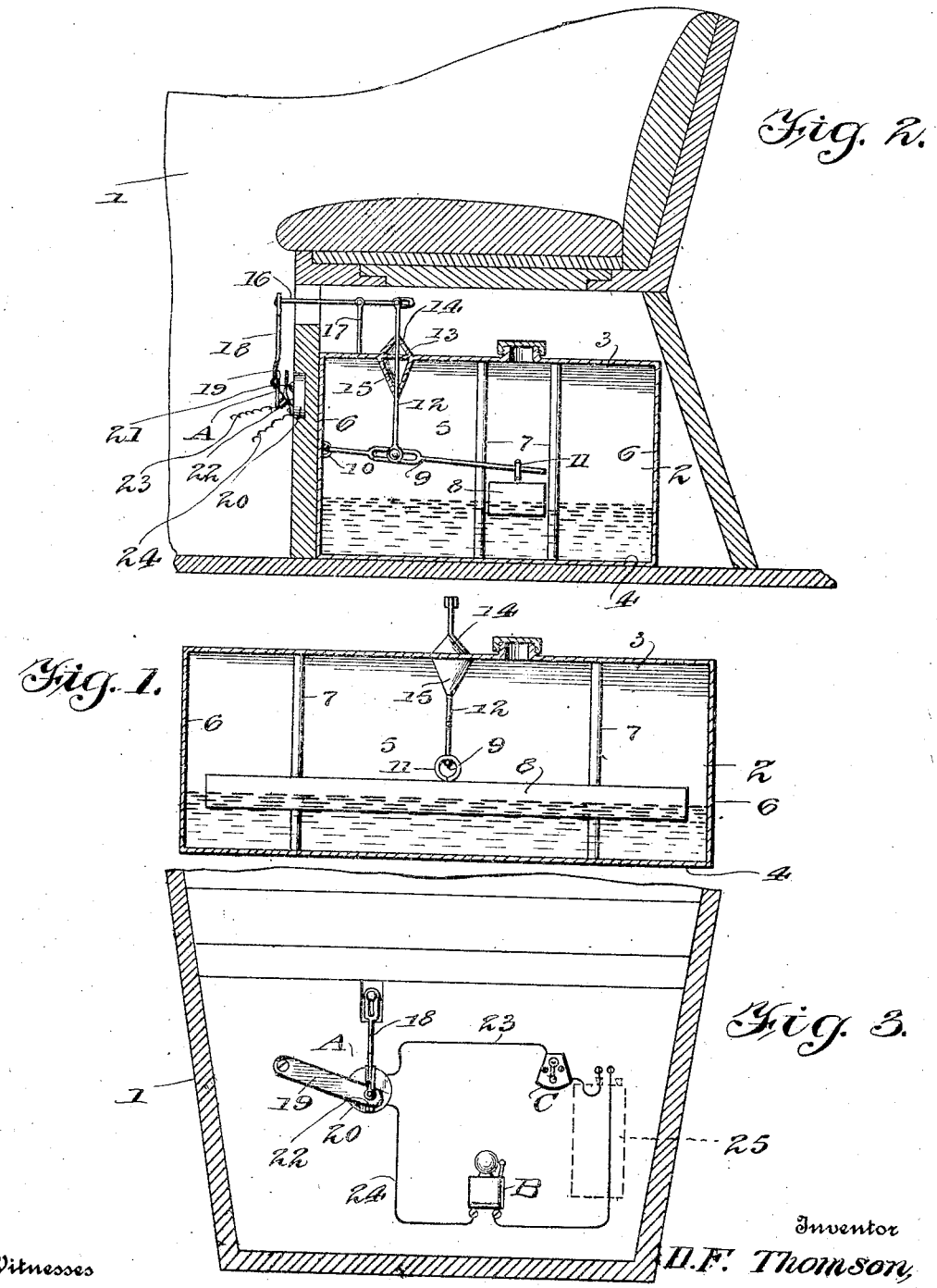
D. F. THOMSON.
FLOAT OPERATED CIRCUIT CLOSER.
APPLICATION FILED OCT. 10, 1914.
1,153,142.
Patented Sept. 7, 1915.

DATLIF F. THOMSON, OF BETTSVILLE, OHIO.

FLOAT-OPERATED CIRCUIT-CLOSER.

1,153,142.   Specification of Letters Patent.   Patented Sept. 7, 1915.

Application filed October 10, 1914. Serial No. 866,053.

*To all whom it may concern:*

Be it known that I, DATLIF F. THOMSON, a citizen of the United States, residing at Bettsville, in the county of Seneca and State of Ohio, have invented new and useful Improvements in Float-Operated Circuit-Closers, of which the following is a specification.

This invention relates to float operated circuit closers and is designed with special reference to the gasolene tanks of motor cars, the object of the invention being to provide reliable means for automatically signaling the operator of a motor car when the level of gasolene in the tank falls to a low predetermined level, thereby advising the operator before he runs out of gasolene.

With the above and other objects in view, the invention consists in the novel construction, combination and arrangement of parts, as herein described, illustrated and claimed.

In the accompanying drawings, Figure 1 is a vertical section through a tank taken longitudinally of the float, illustrating the application of the present invention thereto. Fig. 2 is a vertical cross section taken at right angles to Fig. 1. Fig. 3 is a front elevation of the tank showing the switch, alarm, cut-out, and electrical connections.

In illustrating the present invention I have shown the same as embodied in a motor car, 1 designating a portion of the front seat of a present day automobile under which the gasolene tank 2 is placed.

The tank is shown as comprising the usual top wall 3, bottom wall 4 and side and end walls 5 and 6, respectively. Connecting the top and bottom walls of the tank are two sets of parallel vertical guides 7 shown in the form of rods, the latter serving as guides for a vertically movable float 8 the width of which is somewhat less than the distance between the guides while the length of said float is preferably nearly as great as the distance between the opposite walls of the tank, the walls thereby serving to hold the float in proper relation to the remainder of the mechanism while allowing the same to rise and fall with the level of gasolene in the tank.

9 designates a float operating lever which is fulcrumed at 10 on the inside of the tank, the free end of said lever working in an eye 11 on the upper side of the float 8 so that as the float rises and falls, it actuates the lever correspondingly.

Extending upwardly from the lever 9 is a stem 12 the lower extremity of which is pivotally connected to said lever. The stem 12 passes through a hole 13 in the top wall of the tank and also through the vertices of a pair of hollow cones, 14 designating a cone extending upwardly from the top wall of the tank and 15 designating an inverted cone extending downwardly from said top wall into the tank. The holes in the projecting extremities of the hollow cones are in line with each other and with the hole in the top wall of the tank and thus the stem 12 has three bearings or guides which are only of sufficient size to allow the stem to work freely up and down, the arrangement of cones avoiding any possibility of gasolene splashing through the top of the tank and evaporating.

The upper extremity of the stem 12 has a jointed connection with a lever 16 supported by a fulcrum post 17 above the tank, said lever 16 being connected by a slotted link 18 with the lever 19 of an electric switch designated generally at A and comprising the base 20 having a contact point 21, and a spring 22 forming the other contact point of the switch. The switch lever is adapted to move between the contact point referred to or to move away from the same so as to make and break the electrical contact, contact being made when the float in the tank reaches a predetermined point or, in other words, just before the gasolene supply is exhausted. The switch A may be mounted on the front of the seat so as to be readily accessible to the operator. From the switch A wires 23 and 24 extend to a battery 25 shown in the form of a dry cell, said circuit wires also including an alarm B and a cut-out C.

It will now be seen that when the float descends to a certain point and before the gasolene is entirely consumed, the switch lever makes electrical contact and causes the alarm to be sounded, thereby notifying the operator that the gasolene supply is becoming exhausted. After he is thus notified, by means of the cut-out C, he may break the electrical connection and terminate the sounding of the alarm. As soon as the tank is refilled, the cut-out is closed so that thereafter the automatic signal will become operative in the same way as previously indicated.

What I claim is:—

In a float operated circuit closer, the combination of a liquid tank embodying top, bottom and side walls, the top wall having a hole therein, a hollow cone extending above said top wall, an inverted cone extending below said top wall, both cones having holes in their vertices in line with each other and the hole in said top wall, a float in said tank, a stem actuated by said float and extending upwardly through both cones and said top wall, a lever to which said stem is connected, an electric switch, a switch lever, and a link connecting said levers.

In testimony whereof I affix my signature in presence of two witnesses.

DATLIF F. THOMSON.

Witnesses:
M. E. WILSON,
M. R. MENCH.